US012761404B2

(12) United States Patent
Liang et al.

(10) Patent No.: US 12,761,404 B2
(45) Date of Patent: Oct. 13, 2026

(54) OPTICAL LENS AND VARIFOCALS

(71) Applicants: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

(72) Inventors: Yuan-Ting Liang, Hsinchu (TW); Chung-Wu Liu, Hsinchu (TW)

(73) Assignees: Asphetek Solution (Chengdu) Ltd., Chengdu (CN); ADVANCED OPTOELECTRONIC TECHNOLOGY, INC., Hsinchu County (TW); Asphetek Solution Inc., Hsinchu (TW)

( * ) Notice: Subject to any disclaimer, the term of this patent is extended or adjusted under 35 U.S.C. 154(b) by 144 days.

(21) Appl. No.: 18/673,288

(22) Filed: May 23, 2024

(65) Prior Publication Data

US 2025/0028092 A1 Jan. 23, 2025

(30) Foreign Application Priority Data

Jul. 17, 2023 (CN) ........................ 202310878077.8

(51) Int. Cl.
*G02B 3/14* (2006.01)
*G02F 1/157* (2006.01)

(52) U.S. Cl.
CPC ............... *G02B 3/14* (2013.01); *G02F 1/157* (2013.01)

(58) Field of Classification Search
CPC ................................. G02B 3/14; G02F 1/157
USPC ........................................................ 359/265
See application file for complete search history.

(56) References Cited

U.S. PATENT DOCUMENTS

| | | | | |
|---|---|---|---|---|
| 10,634,824 | B1 * | 4/2020 | Ouderkirk | G02B 3/14 |
| 2007/0211207 | A1 * | 9/2007 | Lo | G02B 26/005 359/666 |
| 2010/0157438 | A1 * | 6/2010 | Griffith | G02B 3/14 359/666 |
| 2013/0114148 | A1 * | 5/2013 | Aschwanden | G02B 26/004 359/666 |
| 2014/0253870 | A1 * | 9/2014 | Jiang | G02C 7/085 359/666 |
| 2018/0226564 | A1 * | 8/2018 | Itayama | B06B 1/06 |

(Continued)

FOREIGN PATENT DOCUMENTS

| | | |
|---|---|---|
| CN | 111090172 A | 5/2020 |
| CN | 115079484 A | 9/2022 |

*Primary Examiner* — Sharrief I Broome
(74) *Attorney, Agent, or Firm* — ScienBiziP, P.C.

(57) ABSTRACT

An optical lens and varifocals include a first transparent substrate and a zoom assembly. The zoom assembly comprises a first piezoelectric assembly and a second piezoelectric assembly, wherein an air layer is formed between the second piezoelectric assembly and the first transparent substrate. Additionally, a space is defined between the second piezoelectric assembly and the first piezoelectric assembly, and this space is filled with a transparent liquid, thereby forming a liquid layer. When the voltages applied to the first piezoelectric assembly and the second piezoelectric assembly are varied, both piezoelectric assemblies undergo deformation, resulting in changes to the surface curvatures of the liquid layer and the air layer.

20 Claims, 7 Drawing Sheets

(56) References Cited

U.S. PATENT DOCUMENTS

2021/0063786 A1* 3/2021 Yamada ................ G02B 26/06
2022/0408030 A1* 12/2022 Ollila ...................... G02B 3/14

* cited by examiner

OPTICAL LENS AND VARIFOCALS

FIELD

The present disclosure relates to field of optical lens technology, and in particular to an optical lens and varifocals.

BACKGROUND

The lens of Augmented Reality (AR)/Mixed Reality (MR) Glasses is in the framework of the glasses, the display function is added, a virtual image is projected onto the lens, and the reality and the virtual image are combined in the user's line of sight. The Virtual Reality (VR) glasses directly generate virtual images that are perceived by the user. The strength of AR/MR/VR glasses depends on the curvature of the lens itself and cannot be freely changed, making products with specific strength need to be customized at the factory.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features and advantages of the present application more obvious, a detailed description of specific embodiments of the present application will be described in detail with reference to the accompanying drawings. A number of details are set forth in the following description so as to fully understand the present application. However, the present application can be implemented in many other ways different from those described herein, and those skilled in the art can make similar improvements without violating the contents of the present application. Therefore, the present application is not to be considered as limiting the scope of the embodiments described herein.

Several definitions that apply throughout this disclosure will now be presented.

The term "coupled" is defined as coupled, whether directly or indirectly through intervening components, and is not necessarily limited to physical connections. The connection may be such that the objects are permanently coupled or releasably coupled. The term "substantially" is defined to be essentially conforming to the particular dimension, shape, or other feature that the term modifies, such that the component need not have that exact feature. The term "comprising," when utilized, means "including, but not necessarily limited to"; it specifically indicates open-ended inclusion or membership in the so-described combination, group, series, and the like.

Unless otherwise defined, all technical and scientific terms used herein have the same meaning as commonly understood by one skilled in the art. The terms used in a specification of the present application herein are only for describing specific embodiments and are not intended to limit the present application. The terms "and/or" used herein includes any and all combinations of one or more of associated listed items.

Figure 1:
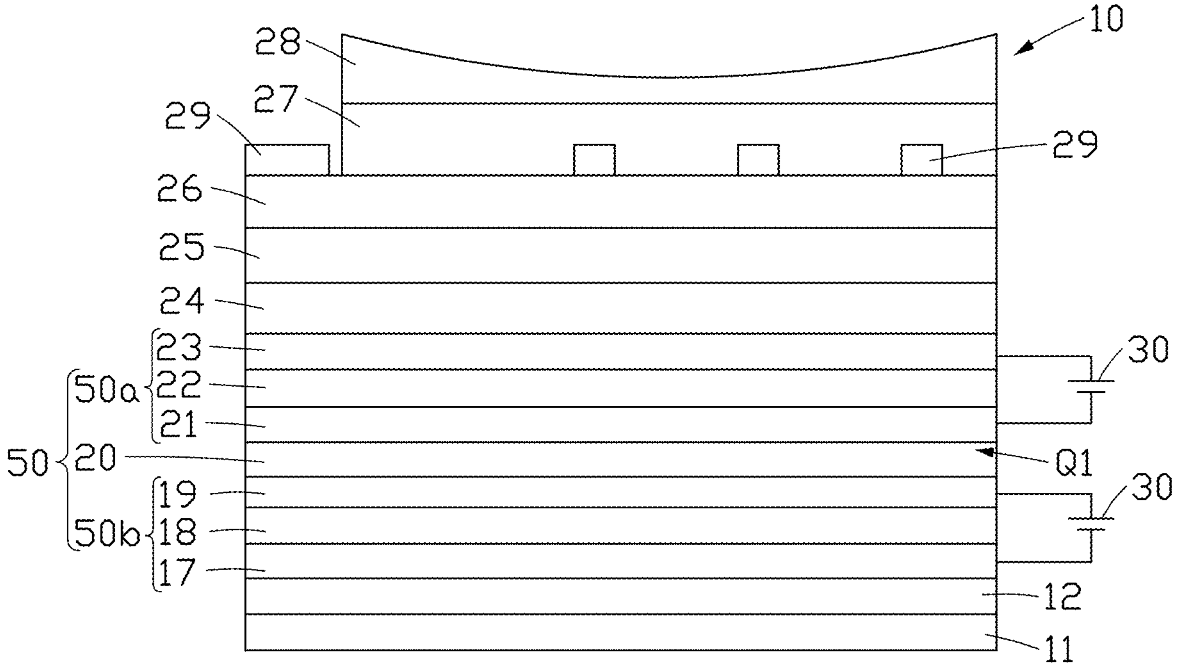
FIG. 1 shows a schematic diagram of a structure of an optical lens of the present application in an embodiment.
Figure 2:
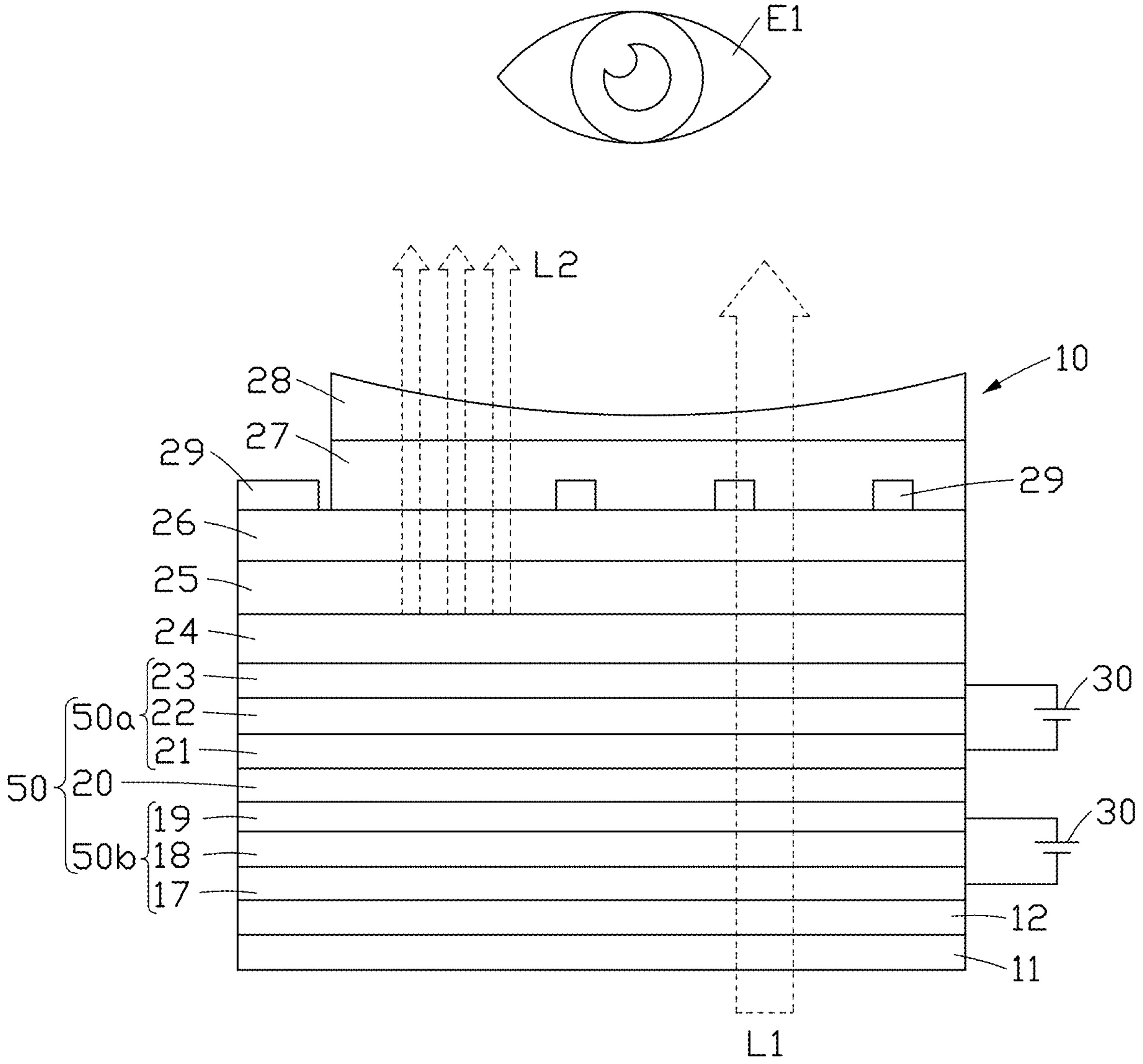
FIG. 2 shows a schematic diagram of a usage status of the optical lens of the present application in FIG. 1.

Referring to FIG. 1 to FIG. 2, in a first embodiment, the optical lens 10 can be used as a lens for AR glasses, MR Glasses, VR glasses and other types of glasses.

The optical lens 10 includes a first transparent substrate 11, a zoom assembly 50, a photoconductive layer 24, a second transparent substrate 25, a functional layer 26, an encapsulation layer 27 and a lens layer 28. From a side away from an eye E1 to a side near the eye E1, the first transparent substrate 11, the zoom assembly 50, the photoconductive layer 24, the second transparent substrate 25, the functional layer 26, the encapsulation layer 27 and the lens layer 28 are arranged in sequence, each layer of the optical lens 10 being made of a light-transmitting material.

The zoom assembly 50 includes a first piezoelectric assembly 50*a*, a second piezoelectric assembly 50*b*, and a liquid layer 20. The liquid layer 20 is formed between the first piezoelectric assembly 50*a* and the second piezoelectric assembly 50*b*. An air layer 12 is formed between the second piezoelectric assembly 50*b* and the first transparent substrate 11. A space Q1 is formed between the second piezoelectric assembly 50*b* and the first piezoelectric assembly 50*a*. The space Q1 is filled with a transparent liquid to form the liquid layer 20. When voltages of the first piezoelectric assembly 50*a* and the second piezoelectric assembly 50*b* are changed, the first piezoelectric assembly 50*a* and the second piezoelectric assembly 50*b* are deformed to change surface curvatures of the liquid layer 20 and the air layer 12.

Wherein, the photoconductive layer 24 is attached to one side of the first piezoelectric assembly 50*a* away from the liquid layer 20. The first transparent substrate 11, the zoom assembly 50, the photoconductive layer 24, the second transparent substrate 25, the functional layer 26, the encapsulation layer 27, and the lens layer 28 are all transparent. The first transparent substrate 11, the second transparent substrate 25 and the lens layer 28 maybe made of glass.

The optical lens 10 further includes a chip 29, the chip 29 is located above the function layer 26. The chip 29 has a circuit, and the functional layer 26 connects the circuit. The chip 29 can be an infrared chip, for example, the infrared chip not only illuminates the eye by emitting infrared light, but also tracks the central position of the eye to indicate the projection of image light and ensure that the projected image light can be clearly presented to the human eye.

Figure 7:
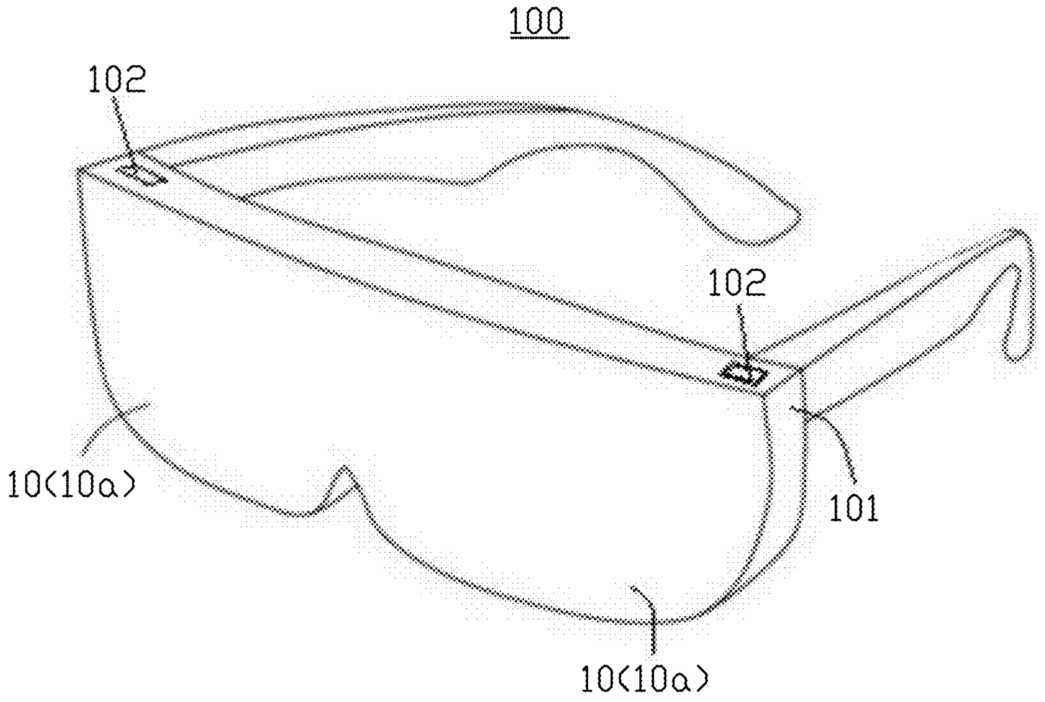
FIG. 7 shows a schematic diagram of a structure of varifocals of the present application in an embodiment.

Referring to FIG. 2, an ambient light L1 passes through the first transparent substrate 11, the air layer 12, the zoom assembly 50, the photoconductive layer 24, the second transparent substrate 25, the functional layer 26, the encapsulation layer 27, and the lens layer 28 in turn. After the ambient light L1 passes through lens layer 28, the ambient light L1 enters into a human eye E1. Thus, the ambient light L1 forms an image of a real object in the human eye E1. In addition, the present embodiment also includes an external display 102, the external display 102 (as shown in FIG. 7) generates an image light L2. After the image light L2 is projected to the optical guide layer 24, the image light L2 passes through the second transparent substrate 25, the functional layer 26, the encapsulation layer 27, and the lens layer 28 in turn, and the image light L2 passes through lens layer 28 and then incident on the human eye E1. The image light L2 produces a virtual image in the human eye E1, so as to realize the enhancement of reality.

The external display 102 can be a display independent of the optical lens 10. In some embodiments, such as when the optical lens 10 is a lens for a pair of glasses, the external display 102 maybe mounted on a frame of the glasses.

In other embodiments, if the optical lens 10 do not need to set an eye-tracking function, the functional layer 26, the chip 29, and the encapsulation layer 27 can be omitted and the lens layer 28 can be superimposed directly on the second transparent substrate 25.

When the optical lens 10 in this application is used, the zoom assembly 50 can achieve a zoom function, thereby changing the degree of the optical lens 10. Specifically, when the degree of optical lens 10 needs to be changed, a suitable voltage is applied to the first piezoelectric assembly 50*a* and the second piezoelectric assembly 50*b* to make the first piezoelectric assembly 50*a* and the second piezoelectric assembly 50*b* undergo a bending deformation. When the first piezoelectric assembly 50*a* and the second piezoelectric assembly 50*b* undergo a bending deformation. The first piezoelectric assembly 50*a* and the second piezoelectric assembly 50*b* can simultaneously change surface curvatures of the liquid layer 20 and the air layer 12, and then change the degree of the optical lens 10.

Therefore, in the first embodiment, the optical lens 10 is capable of changing the degree as required. At the same time, in this embodiment, the optical lens 10 sets an air layer 12, on the one hand, the air layer 12 provides a buffer for the bending deformation of the second piezoelectric assembly 50*b* to the first transparent substrate 11. On the other hand, a deformation of the air layer 12 combined with a deformation of the liquid layer 20 is conducive to realizing a wider range of degree adjustment.

Referring to FIG. 1, the first piezoelectric assembly 50*a* in the first embodiment comprises a first piezoelectric material layer 22 and two first electrode layers 21, 23. The two first electrode layers 21, 23 are attached to each side of the first piezoelectric material layer 22. The second piezoelectric assembly 50*b* comprises a second piezoelectric material layer 18 and two second electrode layers 17, 19. The two second electrode layers 17, 19 are attached to each side of the second piezoelectric material layer 18. When used, a power supply 30 can apply different voltages for the two second electrode layers 17, 19, a bending degree of the first piezoelectric assembly 50*a*/second piezoelectric assembly 50*b* can be adjusted by the different voltages between the two first electrode layers 21, 23.

In the first embodiment, the first piezoelectric material layer 22/the second piezoelectric material layer 18 may be a piezoelectric film made of a piezoelectric material. Among them, the piezoelectric material can be such as PVDF (polyvinylidene fluoride), copolymer (copolymer material), and so on. A thickness of the piezoelectric film is 10 nm-500 um. A material of the first electrode layer 21, 23/the second electrode layer 17, 19 can use ITO (indium tin oxide), AZO (zinc aluminum oxide), FTO (tin fluoride oxide) and other transparent conductive glass materials. A thickness of the first electrode layer 21, 23/the second electrode layer 17, 19 can be set at 10 nm-1 mm according to needs. The transparent liquid of liquid layer 20 adopts a high refractive index liquid, such as silicone oil. A thickness of air layer 12 is between 1 um and 1 mm.

Figure 3:
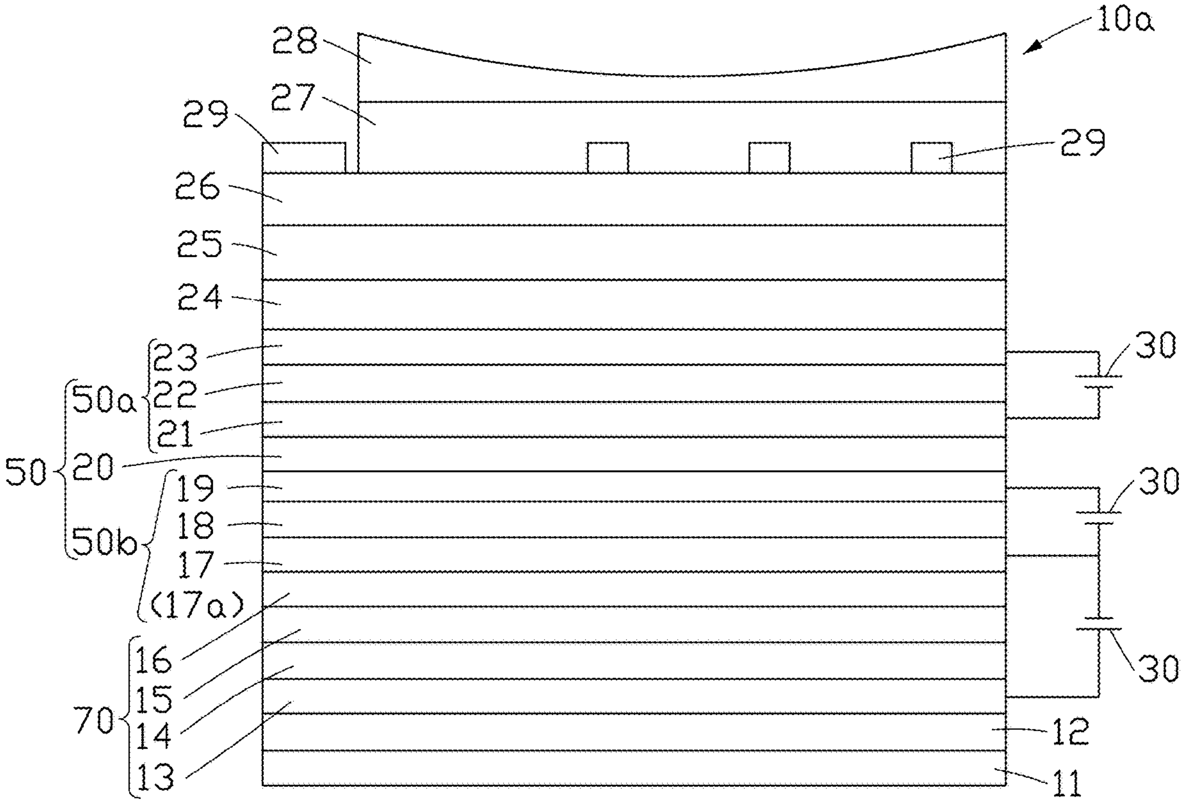
FIG. 3 shows a schematic diagram of a structure of an optical lens of the present application in another embodiment.
Figure 4:
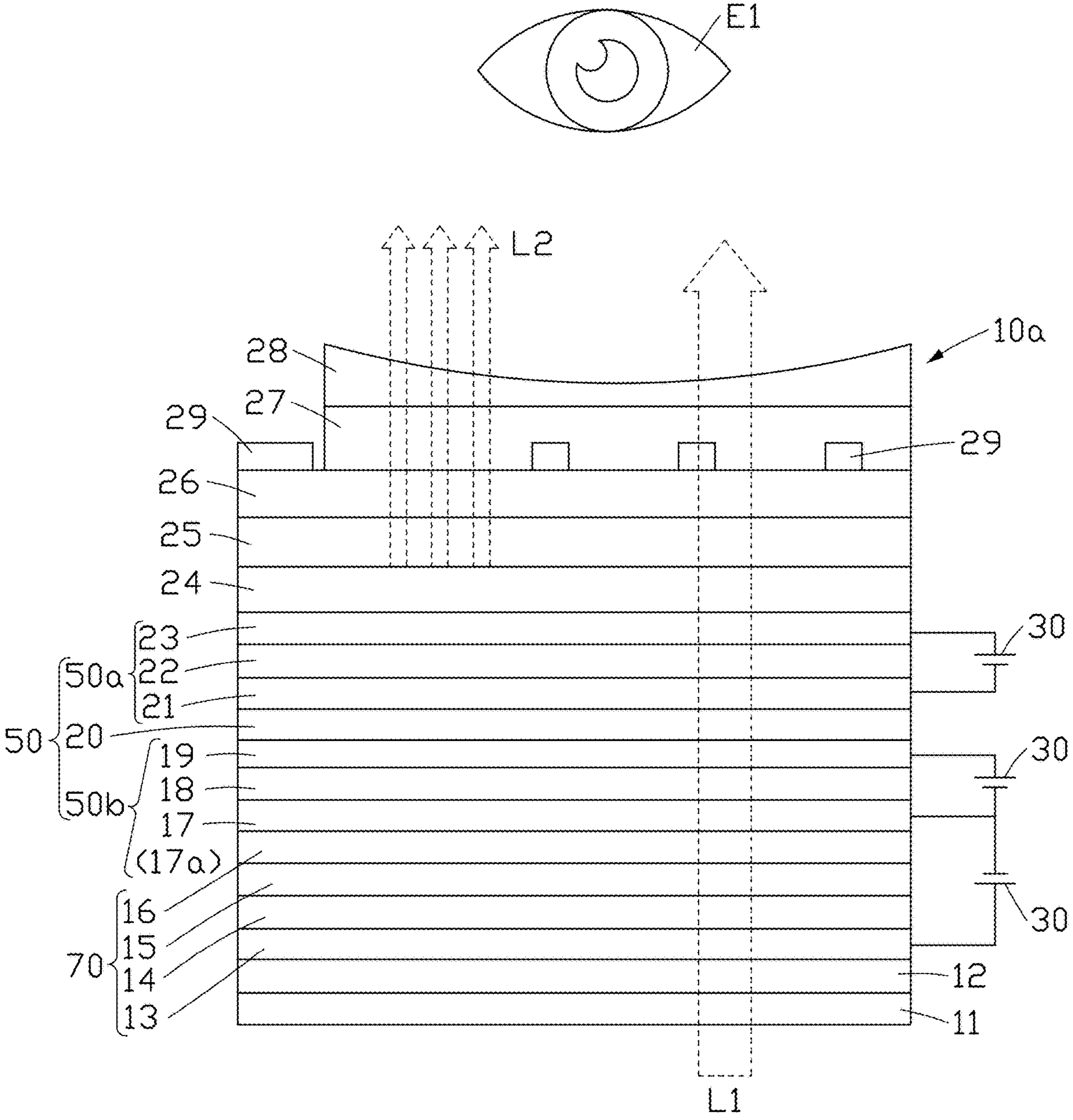
FIG. 4 shows a schematic diagram of a usage status of the optical lens of the present application in FIG. 3.

Referring to FIG. 3 to FIG. 4, a second embodiment further provides an optical lens 10*a*. Based on the optical lens 10 in the first embodiment, an electrochromic assembly 70 is added to the optical lens 10*a*.

In the optical lens 10*a*, the second piezoelectric assembly 50*b* is located on one side of the liquid layer 20 near the air layer 12, the second piezoelectric assembly 50*b* is provided with an electrochromic assembly 70, the electrochromic assembly 70 is located on one side of the second piezoelectric assembly 50*b* near the air layer 12, when an electric field changes, color of the electrochromic assembly 70 is changed. That is, in the second embodiment, the air layer 12 is located between the electrochromic assembly 70 and the first transparent substrate 11.

The electrochromic assembly 70 is bonded to the second piezoelectric assembly 50*b*. When the second piezoelectric assembly 50*b* bends, the electrochromic assembly 70 bends with the second piezoelectric assembly 50*b*. In some embodiments, the electrochromic assembly 70 comprises a third electrode layer 17*a*, an ion storage layer 16, an electrolyte layer 15, an electrochromic material layer 14, and a fourth electrode 13, which are sequentially superimposed. Among them, the third electrode layer 17*a* is located on one side of the electrochromic assembly 70 near the second piezoelectric assembly 50*b*. When a voltage between the third electrode layer 17*a* and the fourth electrode layer 13 changes, the ions can be moved between the ion storage layer 16 and the electrochromic material layer 14, thus changing the color of the electrochromic assembly 70. When in use, the color of the electrochromic assembly 70 can be adjusted by applying different voltages between the third electrode layer 17*a* and the fourth electrode layer 13, the different voltages can be applied by a power supply 30. Optionally, the third electrode layer 17*a* and the second electrode layer 17 of the second piezoelectric assembly 50*b* may share the same electrode layer, that is, the third electrode layer 17*a* and the second electrode layer 17 are actually set as one layer. In other embodiments, the two may also have a layer for each.

Materials of the third electrode layer 17*a* and the fourth electrode layer 13 can include ITO (indium tin oxide), AZO (zinc aluminum oxide), FTO (tin fluoride oxide) and other transparent conductive glass materials. Thicknesses of the third electrode layer 17*a* and the fourth electrode layer 13 can be set at 10 nm-1 mm as required. Material of the ion storage layer 16 can include NiO, $CeO_2$, $V_2O_5$. Thicknesses of the ion storage layer 16 is 1 nm-100 um. Material of the electrolyte layer 15 can include $Ta_2O_3$, PVDF, PE (polyethylene), HPMC (hydroxypropyl methyl cellulose), etc. A thickness of electrolyte layer 15 is 1 nm-100 um. Material of the electrochromic material layer 14 can include $WO_3$, $MoO_3$, Prussian blue, etc. A thickness of electrochromic material layer 14 is 1 nm-100 um.

The electrochromic assembly 70 can use a voltage control to move ions between the ion storage layer 16 and the electrochromic material layer 14. Through a combination and a separation of ions and the electrochromic material, the color of the optical lens 10*a* can be freely changed.

Referring to FIG. 4, ambient light L1 can pass through the first transparent substrate 11, the air layer 12, the electrochromic assembly 70, the zoom assembly 50, the photoconductive layer 24, the second transparent substrate 25, the functional layer 26, the encapsulation layer 27, and the lens layer 28 in turn. After the ambient light L1 passes through the lens layer 28, the ambient light L1 is injected into the human eye E1, thus forming a realistic image in the human eye E1 by the ambient light L1. In addition, the second embodiment includes an external display 102 (referring to FIG. 7), the external display 102 can generate an image light L2, the image light L2 is projected onto the photoconductive layer 24 and then passes through a second transparent substrate 25, a functional layer 26, an encapsulation layer 27 and a lens layer 28. After the image light L2 passes through the lens layer 28, the image light L2 incident on the human eye E1, so that a virtual image is generated by the image light L2 in the human eye E1 to realize the enhancement of reality.

When the optical lens 10*a* in the second embodiment is in use, the zoom assembly 50 can achieve a zoom function, the zoom function can change a degree of the optical lens 10*a*. Specifically, when the degree of optical lens 10*a* needs to be changed, the first piezoelectric assembly 50*a* and the second piezoelectric assembly 50*b* are applied with appropriate voltage, so that the first piezoelectric assembly 50*a* and the second piezoelectric assembly 50*b* will bend. The first piezoelectric assembly 50*a* and the second piezoelectric assembly 50*b* simultaneously change surface curvatures of the liquid layer 20 and the air layer 12, and then change the degree of the optical lens 10*a*.

Therefore, the optical lens 10*a* in the second embodiment is capable of changing the degree as needed. The optical lens 10*a* in the second embodiment is provided with an air layer 12. On the one hand, when the second piezoelectric assembly 50*b* bends to the first transparent substrate 11, the bending deformation of the second piezoelectric assembly 50*b* is buffered by the air layer 12. On the other hand, the deformation of the air layer 12 combined with the deformation of the liquid layer 20 is conducive to realizing a wider range of degree adjustment.

In addition, a content displayed on the optical lens 10*a* will decrease in contrast due to the increased brightness of the ambient light L1, making a display difficult to read by a naked eye. Using the optical lens 10*a* in the second embodiment, when the ambient light L1 is brighter, the electrochromic assembly 70 can be adjusted to a darker color (or less transparent) by changing the voltage, thereby reducing the brightness of the passing ambient light L1 and ensuring that the image light L2 is also clearly displayed. Conversely, when the ambient light L1 brightness is small, the voltage can be changed to adjust the electrochromic assembly 70 to a lighter color (or greater transparency) to ensure that the ambient light L1 has a greater transmittance and ensure a clear field of view of the environmental image.

In the second embodiment, the electrochromic assembly 70 is fitted to the second piezoelectric assembly 50*b*, thus ensuring that the electrochromic function and the zoom function are compatible without the problem of affecting the zoom accuracy or zoom effect due to the obstruction of the electrochromic assembly 70. When the third electrode layer 17*a* and the second piezoelectric assembly 50*b* share the same electrode layer, in addition to reduce the number of layers, the thickness and the process steps, it can also improve the unity of electrochromic assembly 70 and zoom assembly 50, and further ensure that the bending deformation of the zoom assembly 50 can occur synchronously in the electrochromic assembly 70, simultaneously ensure zoom effect and electrochromic effect.

Figure 5:
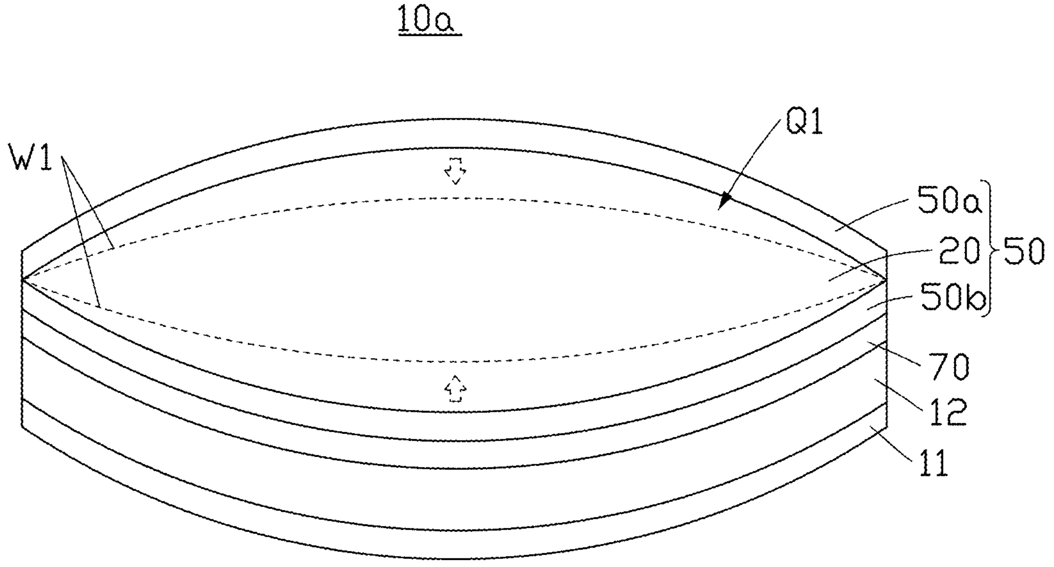
FIG. 5 shows a schematic diagram of a principle of zoom of an optical lens of the present application in an embodiment.

Referring to FIG. 5, in one embodiment, a bending direction of the second piezoelectric assembly 50*b* is opposite to a bending direction of the first piezoelectric assembly 50*a*, and the second piezoelectric assembly 50*b* and the first piezoelectric assembly 50*a* are bent in a direction away from each other so that the liquid layer 20 forms a convex lens. For example, as shown in FIG. 5, when the voltage changes, the first piezoelectric assembly 50*a* and the second piezoelectric assembly 50*b* can be changed to the first position W1 indicated by the dotted line, and the focal length of the liquid layer 20 in the shape of a convex lens becomes smaller, and the degree of the corresponding optical lens 10 becomes smaller.

Figure 6:
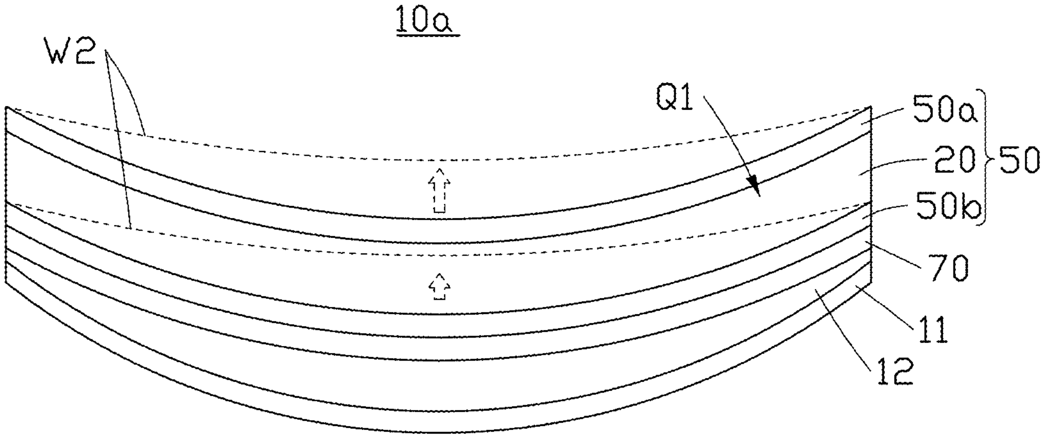
FIG. 6 shows a schematic diagram of a principle of zoom of an optical lens of the present application in another embodiment.

Referring to FIG. 6, in another embodiment, the second piezoelectric assembly 50*b* and the first piezoelectric assembly 50*a* bend in the same direction so that the liquid layer 20 forms a concave lens. For example, as shown in FIG. 6, when the voltage changes, the first piezoelectric assembly 50*a* and the second piezoelectric assembly 50*b* can be changed to the second position W2 indicated by the dotted line, and a focal length of the liquid layer 20 in a shape of a concave lens becomes smaller, and a degree of the corresponding optical lens 10 becomes smaller.

In the embodiments shown in FIG. 5 and FIG. 6 above, when a voltage change of the first piezoelectric assembly 50*a* is same as a voltage change of the second piezoelectric assembly 50*b*, a degree of deformation of the first piezoelectric assembly 50*a* and a degree of deformation of the second piezoelectric assembly 50*b* can be the same or different, and the specific settings can be set according to the needs, without limitation here.

Referring to FIG. 7, an embodiment of the present application also provides varifocals 100. The varifocals 100 includes a frame 101 and the optical lens 10 or the optical lens 10*a*. The optical lens 10, 10A is connected to the frame 101. The varifocals 100 can be AR glasses, VR glasses, MR glasses or other types of glasses.

Referring to FIG. 7, the varifocals 100 comprises two optical lenses 10 or the optical lenses 10*a*. Two optical lenses 10 or the optical lenses 10*a* are used for each of the two eyes. Optionally, the varifocals 100 also includes two external displays 102. The two external displays 102 can be mounted on each of the two mirror legs of frame 101 or in other locations. The external display 102 can produce the image light L2, which can be projected to the eye by the photoconductive layer 24.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An optical lens, comprising:

a first transparent substrate; and a zoom assembly comprises a first piezoelectric assembly and a second piezoelectric assembly, an air layer is formed between the second piezoelectric assembly and the first transparent substrate; a space is formed between the second piezoelectric assembly and the first piezoelectric assembly, and the space is filled with a transparent liquid to form a liquid layer; when voltages of the first piezoelectric assembly and the second piezoelectric assembly are changed, the first piezoelectric assembly and the second piezoelectric assembly are deformed to change surface curvatures of the liquid layer and the air layer.

2. The optical lens as claimed in claim 1, wherein, the first piezoelectric assembly comprises a first piezoelectric material layer and two first electrode layers, the two first electrode layers are respectively attached to two sides of the first piezoelectric material layer; the second piezoelectric assembly comprises a second piezoelectric material layer and two second electrode layers, the two second electrode layers are respectively attached to two sides of the second piezoelectric material layer.

3. The optical lens as claimed in claim 1, wherein, the first piezoelectric assembly is deformed in a first bending direction, the second piezoelectric assembly is deformed in a second bending direction, the second bending direction of the second piezoelectric assembly is opposite to the first bending direction of the first piezoelectric assembly, and the second piezoelectric assembly and the first piezoelectric assembly are bent in a direction away from each other so that the liquid layer forms a convex lens.

4. The optical lens as claimed in claim 1, wherein, the first piezoelectric assembly is deformed in a first bending direction, the second piezoelectric assembly is deformed in a second bending direction, the second bending direction of the second piezoelectric assembly is same as the first bending direction of the first piezoelectric assembly so that the liquid layer forms a concave lens.

5. The optical lens as claimed in claim 1, wherein, the second piezoelectric assembly is located on one side of the liquid layer near the air layer; the second piezoelectric assembly comprises with an electrochromic assembly, and the electrochromic assembly is located on one side of the second piezoelectric assembly near the air layer, when an electric field changes, a color of the electrochromic assembly is changed; the electrochromic assembly is bonded to the second piezoelectric assembly such that the electrochromic assembly deforms with the second piezoelectric assembly.

6. The optical lens as claimed in claim 5, wherein, the electrochromic assembly further comprises a third electrode layer, an ion storage layer, an electrolyte layer, an electrochromic material layer and a fourth electrode successively superimposed on the side of the second piezoelectric assembly near the air layer, wherein the third electrode layer is located on one side of the electrochromic assembly near the second piezoelectric assembly; a voltage change between the third electrode layer and the fourth electrode layer causes ions to move between the ion storage layer and the electrochromic material layer, thereby changing a color of the electrochromic assembly.

7. The optical lens as claimed in claim 6, wherein, the third electrode layer and the second piezoelectric assembly are formed on one electrode layer.

8. The optical lens as claimed in claim 1, wherein, the optical lens further comprises a photoconductive layer, a second transparent substrate and a lens layer arranged in said sequence, and the photoconductive layer is attached to a side of the first piezoelectric assembly away from the liquid layer; each of the photoconductive layer, the second transparent substrate and the lens layer is transparent; after the image light generated by an external display is projected to the optical guide layer, the image light is transmitted through the second transparent substrate and the lens layer and then incidents on a human glasses to produce a virtual image.

9. The optical lens as claimed in claim 1, wherein, a thickness of the air layer is 1 um~1 mm.

10. The optical lens as claimed in claim 1, wherein, a material of the liquid layer is silicone oil.

11. A varifocals, comprising:

a frame;

an optical lens, connected to the frame, the optical lens comprising:

a first transparent substrate; and a zoom assembly comprises a first piezoelectric assembly and a second piezoelectric assembly, an air layer is formed between the second piezoelectric assembly and the first transparent substrate; a space is formed between the second piezoelectric assembly and the first piezoelectric assembly, and the space is filled with a transparent liquid to form a liquid layer; when voltages of the first piezoelectric assembly and the second piezoelectric assembly are changed, the first piezoelectric assembly and the second piezoelectric assembly are deformed to change surface curvatures of the liquid layer and the air layer.

12. The varifocals as claimed in claim 11, wherein, the first piezoelectric assembly comprises a first piezoelectric material layer and two first electrode layers, the two first electrode layers are respectively attached to two sides of the first piezoelectric material layer; the second piezoelectric assembly comprises a second piezoelectric material layer and two second electrode layers, the two second electrode layers are respectively attached to two sides of the second piezoelectric material layer.

13. The varifocals as claimed in claim 11, wherein, the first piezoelectric assembly is deformed in a first bending direction, the second piezoelectric assembly is deformed in a second bending direction, the second bending direction of the second piezoelectric assembly is opposite to the first bending direction of the first piezoelectric assembly, and the second piezoelectric assembly and the first piezoelectric assembly are bent in a direction away from each other so that the liquid layer forms a convex lens.

14. The varifocals as claimed in claim 11, wherein, the first piezoelectric assembly is deformed in a first bending direction, the second piezoelectric assembly is deformed in a second bending direction, the second bending direction of the second piezoelectric assembly is same as the first bending direction of the first piezoelectric assembly so that the liquid layer forms a concave lens.

15. The varifocals as claimed in claim 11, wherein, the second piezoelectric assembly is located on one side of the liquid layer near the air layer; the second piezoelectric assembly comprises with an electrochromic assembly, and the electrochromic assembly is located on one side of the second piezoelectric assembly near the air layer, when an electric field changes, a color of the electrochromic assembly is changed; the electrochromic assembly is bonded to the second piezoelectric assembly such that the electrochromic assembly deforms with the second piezoelectric assembly.

16. The varifocals as claimed in claim 15, wherein, the electrochromic assembly further comprises a third electrode layer, an ion storage layer, an electrolyte layer, an electrochromic material layer and a fourth electrode successively superimposed on the side of the second piezoelectric assembly near the air layer, wherein the third electrode layer is located on one side of the electrochromic assembly near the second piezoelectric assembly; a voltage change between the third electrode layer and the fourth electrode layer causes ions to move between the ion storage layer and the electrochromic material layer, thereby changing a color of the electrochromic assembly.

17. The varifocals as claimed in claim 16, wherein, the third electrode layer and the second piezoelectric assembly are formed on one electrode layer.

18. The varifocals as claimed in claim 11, wherein, the optical lens further comprises a photoconductive layer, a second transparent substrate and a lens layer arranged in said sequence, and the photoconductive layer is attached to a side of the first piezoelectric assembly away from the liquid layer; each of the photoconductive layer, the second transparent substrate and the lens layer is transparent; after the image light generated by an external display is projected to the optical guide layer, the image light is transmitted through the second transparent substrate and the lens layer and then incidents on a human glasses to produce a virtual image.

19. The varifocals as claimed in claim 11, wherein, a thickness of the air layer is 1 um~1 mm.

20. The varifocals as claimed in claim 11, wherein, a material of the liquid layer is silicone oil.

* * * * *